United States Patent [19]

Meyer

[11] Patent Number: 5,110,427

[45] Date of Patent: May 5, 1992

[54] PROCESS FOR THE PREPARATION BY CRUSHING OF SCRAP COMPRISING METAL PARTS PROVIDED WITH A SURFACE COATING

[75] Inventor: Klaus Meyer, Schaffhausen, Switzerland

[73] Assignee: Alusuisse-Longz Services, Ltd., Zurich, Switzerland

[21] Appl. No.: 645,047

[22] Filed: Jan. 24, 1991

[30] Foreign Application Priority Data

Feb. 8, 1990 [CH] Switzerland ............................ 407/90

[51] Int. Cl.$^5$ ........................ C25C 3/08; C25C 3/12; H05B 7/094
[52] U.S. Cl. .................................... 204/67; 204/294; 252/512; 373/89
[58] Field of Search ................. 204/67, 294; 252/512; 373/79, 82, 88, 89, 93

[56] References Cited

U.S. PATENT DOCUMENTS

| | | | |
|---|---|---|---|
| 3,438,876 | 4/1969 | Marshall, Jr. | 373/89 X |
| 4,288,353 | 9/1981 | Eckel et al. | 260/28 R |
| 4,726,892 | 2/1988 | Foulkes | 204/294 |
| 4,784,733 | 11/1988 | Cutshall | 204/67 |
| 4,927,459 | 5/1990 | Gardner | 75/685 |

FOREIGN PATENT DOCUMENTS

| | | | |
|---|---|---|---|
| 378336 | 7/1985 | Australia. | |
| 944568 | 4/1974 | Canada. | |
| 0027534 | 4/1981 | European Pat. Off.. | |
| 3802670 | 8/1989 | Fed. Rep. of Germany. | |
| 4949084 | 12/1974 | Japan | 204/294 |

*Primary Examiner*—Donald R. Valentine
*Attorney, Agent, or Firm*—Bachman & LaPointe

[57] ABSTRACT

Known processes for the preparation by crushing of scrap comprising metal parts provided with a surface coating have the disadvantage that they are very complex and/or only allow the reuse of one component of the scrap.

These disadvantages can be avoided if the crushed parts are fed to a carbon-containing mass used in the electrochemical industry, in particular a Söderberg mass of a carbon-containing mass for the production of cathode or anode blocks for the generation of aluminum by the Hall-Heroult process.

15 Claims, No Drawings

PROCESS FOR THE PREPARATION BY CRUSHING OF SCRAP COMPRISING METAL PARTS PROVIDED WITH A SURFACE COATING

BACKGROUND OF THE INVENTION

The invention relates to a process for the preparation by crushing of scrap comprising metal parts provided with a surface coating.

Such a process is known from EP-A-125,435, this process working in such a way that the metal parts to be prepared are fed to a coarse crusher and crushed to a particle size of 1 mm to 20 mm. The coarse fraction is fed to a fine crushing, on which the coarse fraction is crushed to a particle size of about 300 µm, after which the solid mixture of metal fraction and non-metal fraction is separated in sifters into the metal fraction and the non-metal fraction. The non-metal fraction is agglomerated and the metal fraction is led away for further processing.

In the production and processing of metal-plastic composite sheets in particular large quantities of scrap occur, for example trimming strips, punching remains or deficient charges. Due to the increasing environmental awareness of consumers, it must be expected that used metal-plastic composite sheets will be increasingly collected and returned to the producer. Until now, such scrap has usually been stored on special dumps or fed to refuse incineration installations.

However, metal-plastic composite sheets contain valuable raw materials, which it is intended to recycle. In this respect, industrial scrap is of particular interest, since it is usually free from impurities and can be collected purely by types.

The known proposals for the recycling of scrap comprising metal parts provided with a surface coating can be divided into those in which a separation into metal fraction and coating fraction is not performed a for example, according to German Offenlegungsschrift 3,110,054, metal-plastic composite sheet scrap is further processed in granulated form, and those in which essentially only one component of the scrap material, usually the metallic component, is recovered, for example, according to JP 53,004,079, by heat treatment of the metal-plastic composite sheet at temperatures in the range of the decomposition of the plastic.

All such proposals, including the process discussed above, are very complex and/or only allow the reuse of one component of the scrap.

SUMMARY OF THE INVENTION

The inventor has therefore set himself the object of providing a process for the preparation by crushing of scrap comprising metal parts provided with a surface coating which does not have the abovementioned disadvantages.

According to the invention, the foregoing object is achieved by a process which is characterized in that the crushed parts are fed to a carbon-containing mass used in the electrochemical industry. Advantageous further developments of the process according to the invention are characterised by the features discussed below. Thus, the metal parts are foils or strips and the crushed parts are chips having a greatest length of about 1 to 30 mm and preferably 1 to 5 mm. The carbon-containing mass may contain up to 10% by weight of crushed parts or up to 6% by weight of crushed parts and preferably 1 to 2% by weight crushed parts.

DETAILED DESCRIPTION

Since, apart from a possibly necessary crushing unit, no additional apparatuses are required for carrying out the process according to the invention, it can be carried out virtually without any additional financial outlay. Furthermore, it is distinguished by the fact that both the metal fraction and the fraction forming the surface coating is reused, in particular in the case where paper-aluminum or plastic-aluminum composite material is used for a mass for the production of aluminum by the Söderberg process or for the production of cathode or anode blocks for the production of aluminum by the Hall-Heroult process. For example, the aluminum in these types of use remains as metal or reacts with the oxygen formed during the electrolysis of the alumina to form aluminum oxide and consequently, in an advantageous way, slightly restricts the anode burn-off and the carbon-containing surface coating. Products are pyrolyzed or coked during the anode production and consequently reduce the coke consumption.

To explain the process according to the invention, test results have been obtained from anodes according to the invention produced under production conditions for the generation of aluminum by the Hall-Heroult process. These reveal further advantages of the process according to the invention and are compiled in table form below.

EXAMPLES

A sheet-like plastic-aluminum-plastic composite material, so-called tube laminate, and sheet-like aluminum-paper composite material, both of which occurred during the production of the composites as trimming sections, was used as scrap comprising metal parts provided with a surface coating. The plastic-aluminum-plastic composite material crushed to 1 to 5 mm was added in quantities of 0.01; 2; 4; and 6% by weight to production-usual carbon-containing masses for the production of anodes for the generation of aluminum by the Hall-Heroult process. In each case 8 anodes were produced under production conditions. Chip metering was performed directly into the first Ko-kneader. It was possible to meter in the chips without any problems with a Gericke screw. The 32 anodes thus produced were calcined in the normal procedure, after which two test pieces were taken from each anode and investigated in the usual way, as regularly takes place for the checking of normal anode production.

In an analogous way, aluminum-paper composite material in maximum chip lengths of 5 to 15 mm was added in 2 and 4% by weight to the same masses.

The important parameters for the characterization of anode bodies, such as electrical resistance, residual $CO_2$ reactivity, dust fraction in the $CO_2$ reactivity test, density and flexural strength, can be taken from Tables 1 and 2. Table 1 relates to the plastic-aluminum-plastic composite material and Table 2 to the aluminum-paper composite material.

In tests with 10% by weight of aluminum-plastic composite material as addition of scrap, a very high electrical resistance was determined. On the other hand, according to Table 1, up to 4% by weight of scrap material, this remains in the region of values which are known from anodes produced from masses containing no scrap materials.

Surprisingly, in the case of the anodes produced by the process according to the invention, the residual $CO_2$ reactivity values are higher than in the case of anodes which were produced without scrap materials. This means that the chips act as inhibitors and the anodes are better with respect to $CO_2$ reactivity. Still more surprising is that, in comparison with anodes without scrap materials, the dust fraction in the $CO_2$ reactivity test reaches an advantageously lower value and can even be brought to below 1% by weight.

The density decreases with increasing addition of chips but, at least in the case of an addition of up to 2% by weight, remains within tolerable values. The test pieces behave very differently with respect to compressive strength. However, at least in the case of small additions of scrap, the compressive strengths reach values which are known from anodes which are produced from carbon-containing masses without scrap materials.

Further tests have shown that additions in the form of larger chips further reduce the density and an addition of chips of a maximum length in excess of 30 mm to usual carbon-containing masses results in inadequate densities.

Furthermore, it has been determined that a metering of chips into the conventional carbon-containing mass in a kneading unit with the aid of a Gericke screw is only possible without problems with chips up to this lastmentioned length. Larger chips no longer allow a homogeneous mixing of the mass and crack-free pressing of the same into anode bodies.

TABLE 1

Scrap: Plastic-aluminum-plastic composite material comprising 67.46% by weight of polyethylene and 32.54% by weight of aluminum
Chip length 1 to 5 mm

| Scrap fraction (% by weight) | 0 | 0.01 | 2 | 4 | 6 |
|---|---|---|---|---|---|
| Electrical resistivity ($\mu\Omega$m) | 67.2 | 71.2 | 71.9 | 76.0 | 80.1 |
| $CO_2$ Reactivity: | | | | | |
| Residual (% by weight) | 90.8 | 91.6 | 93.6 | 95.1 | 96.4 |
| Dust (% by weight) | 3.2 | 3.0 | 0.8 | 0.4 | 0.4 |
| Density (calcined) (g/ml) | 1.62 | 1.63 | 1.59 | 1.54 | 1.49 |
| Flexural strength ($10^5$N/m$^2$) | 72.8 | 70.5 | 67.7 | 52.7 | 58.8 |

TABLE 2

Scrap: Paper-aluminum composite material comprising 51.40% by weight of paper and 49.6% by weight of aluminum

| Scrap fraction (% by weight) | 0 | 0.01 | 2 | 4 |
|---|---|---|---|---|
| Electrical resistivity ($\mu\Omega$m) | 67.2 | 72.9 | 78.2 | 80.0 |
| $CO_2$ Reactivity: | | | | |
| Residual (% by weight) | 90.8 | 92.0 | 97.7 | 97.8 |
| Dust (% by weight) | 3.2 | 2.2 | 0.4 | 0.1 |
| Density (calcined) (g/ml) | 1.62 | 1.60 | 1.58 | 1.56 |
| Flexural strength ($10^5$N/m$^2$) | 72.8 | 68.4 | 55.4 | 53.0 |

I claim:

1. Process which comprises providing scrap comprising metal parts provided with a surface coating, crushing said parts, adding the crushed parts to a carbon-containing mass used in the electrochemical industry to form a carbon-crushed part composite, and including the step of using said composite in the electrochemical industry.

2. Process according to claim 1 wherein the surface coating is selected from the group consisting of plastic, paper and mixtures thereof.

3. Process according to claim 2 wherein the metal is aluminum or an aluminum alloy.

4. Process according to claim 3 wherein the metal parts are foils or strips.

5. Process according to claim 3 wherein the carbon-containing mass is a mass for the production of cathode or anode blocks for the generation of aluminum by the Hall-Heroult process.

6. Process according to claim 1 wherein the carbon-containing mass contains up to 10% by weight of crushed parts.

7. Process according to claim 6 wherein the carbon-containing mass contains up to 6% by weight of crushed parts.

8. Process according to claim 7 wherein the carbon-containing mass contains up to 1-2% by weight of crushed parts.

9. Process according to claim 1 wherein the crushed parts are added to a carbon-containing mass used in the electrochemical industry for the production of aluminum, and including the step of using said composite in the electrochemical industry to produce aluminum by a process selected from the group consisting of the Soderberg process and the Hall-Heroult process.

10. Process which comprises providing scrap comprising aluminum or aluminum alloy parts provided with a surface coating wherein said parts are a sheet-like composite material selected from the group consisting of aluminum and plastic and aluminum and paper and mixtures thereof, crushing said parts, and adding the crushed parts to a carbon-containing mass used in the electrochemical industry.

11. Process according to claim 10 wherein said metal part is a plastic-aluminum-plastic composite.

12. Process which comprises providing scrap comprising metal parts provided with a surface coating, crushing said parts to form chips having a greatest length of about 1 to 30 mm, and adding the crushed parts to a carbon-containing mass used in the electrochemical industry.

13. Process which comprises providing scrap comprising aluminum or aluminum alloy parts provided with a surface coating wherein said coating is selected from the group consisting of plastic, paper and mixtures thereof, crushing said parts, and adding the crushed parts to a carbon-containing mass used in the electrochemical industry wherein said mass is a Soderberg mass for the generation of aluminum by the Soderberg process.

14. Anode and cathode blocks for the generation of aluminum by the Hall-Heroult process using a mass produced by providing aluminum or aluminum alloy parts provided with a surface coating selected from the group consisting of plastic, paper and mixtures thereof, crushing said parts, adding the crushed parts to a carbon-containing mass used in the electrochemical industry to form a carbon-crushed part composite, and forming anode and cathode blocks for the generation of aluminum by the Hall-Heroult process therefrom.

15. Soderberg anode for the generation of aluminum using a mass produced by providing aluminum or aluminum alloy parts provided with a surface coating selected from the group consisting of plastic, paper and mixtures thereof, crushing said parts, adding the crushed parts to a carbon-containing mass used in the electrochemical industry to form a carbon-crushed part composite, and forming a Soderberg anode for the generation of aluminum therefrom.

* * * * *